United States Patent
Kamath et al.

(10) Patent No.: US 10,218,209 B2
(45) Date of Patent: Feb. 26, 2019

(54) SELECTING A CHARGING MODE FOR CHARGING A BATTERY OF A PORTABLE DEVICE

(71) Applicant: MOTOROLA MOBILITY LLC, Chicago, IL (US)

(72) Inventors: Roshan Kamath, Evanston, IL (US); Zong-Hua Liu, Evanston, IL (US)

(73) Assignee: Motorola Mobility LLC, Chicago, IL (US)

(*) Notice: Subject to any disclaimer, the term of this patent is extended or adjusted under 35 U.S.C. 154(b) by 206 days.

(21) Appl. No.: 15/218,320

(22) Filed: Jul. 25, 2016

(65) Prior Publication Data

US 2018/0026469 A1 Jan. 25, 2018

(51) Int. Cl.
*H02J 7/00* (2006.01)
*H02J 7/02* (2016.01)
*H02J 7/04* (2006.01)

(52) U.S. Cl.
CPC ............. *H02J 7/025* (2013.01); *H02J 7/027* (2013.01); *H02J 7/042* (2013.01); *H02J 2007/0001* (2013.01)

(58) Field of Classification Search
CPC .. H02J 7/025; H02J 7/042; H02J 7/027; H02J 2007/0001
See application file for complete search history.

(56) References Cited

U.S. PATENT DOCUMENTS

| 2008/0238361 A1* | 10/2008 | Pinnell | H02J 7/0008 320/107 |
| 2016/0064959 A1* | 3/2016 | Jung | G06F 1/266 320/162 |

FOREIGN PATENT DOCUMENTS

FR 2016173968 * 4/2016

* cited by examiner

*Primary Examiner* — Drew A Dunn
*Assistant Examiner* — Sailesh Thapa
(74) *Attorney, Agent, or Firm* — Yudell Isidore PLLC (57) ABSTRACT

A method, system, and computer program product for selecting a charging mode from among the set of charging modes supported by a charging device for charging a battery of a portable device. The method includes detecting a coupling of a charging device and the portable device. In response to detecting the coupling, a set of charging modes supported by the charging device is determined. The method further includes identifying whether the set of charging modes includes a particular charging mode. In response to identifying the charging device supports the particular charging mode, a first notification is issued to the charging device to trigger the charging device to operate in the particular charging mode. In response to identifying the charging device does not support the particular charging mode, an alternate charging mode is selected from among the set of charging modes.

20 Claims, 4 Drawing Sheets

SELECTING A CHARGING MODE FOR CHARGING A BATTERY OF A PORTABLE DEVICE

BACKGROUND

1. Technical Field

The present disclosure generally relates to portable electronic devices and in particular to portable electronic devices with rechargeable batteries.

2. Description of the Related Art

Modern portable devices equipped with a rechargeable battery are configured to connect with a charger that is used to charge the rechargeable battery. However, when connected to a charging device, the portable device is typically limited to a charging mode that is selected by the charging device. The charging mode selected by the charging device may be limited to a particular current and/or voltage that is lower than a maximum current and/or voltage supported by the portable device and battery. Further still, during charging, enhanced charging modes which provide higher voltages for use in charging the battery of the portable device may cause an increased portion of electrical energy to be wasted as heat.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, system, and computer program product for selecting a charging mode for charging a battery of a portable device from among a set of charging modes supported by the charging device. The method includes detecting a coupling of a charging device by a portable device having a battery. In response to detecting the coupling of the charging device to the portable device, a set of charging modes supported by the charging device is determined. The method further includes identifying whether the set of charging modes includes a particular charging mode. In response to identifying that the charging device supports the particular charging mode, a first notification is issued to the charging device to trigger the charging device to operate in the particular charging mode. In response to identifying that the charging device does not support the particular charging mode, an alternate charging mode that defines a fixed voltage and/or current for charging the battery is selected from among the supported charging modes of the charging device.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Figure 1:
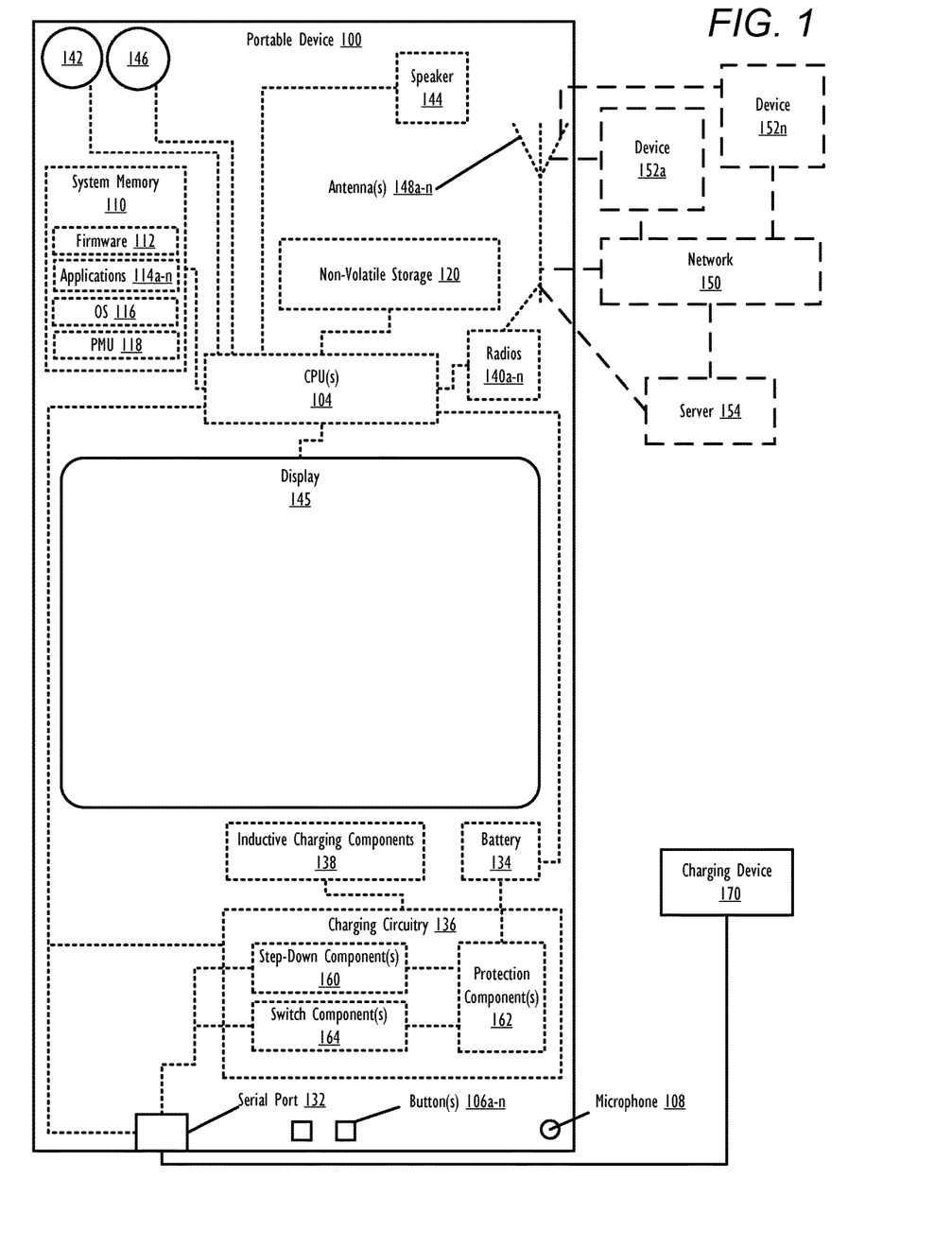
FIG. 1 provides a block diagram representation of an example portable device within which certain aspects of the disclosure can be practiced, in accordance with one or more embodiments.

Those of ordinary skill in the art will appreciate that the hardware components and basic configuration depicted in the following figures may vary. For example, the illustrative components within portable device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example portable device 100 within which one or more of the described features of the various embodiments of the disclosure can be implemented. In one embodiment, portable device 100 can be any portable device that includes at least one battery, such as, but not limited to, a notebook computer, mobile phone, portable battery pack, smart watch, digital camera, video recorder, or tablet computer. Portable device 100 includes at least one processor or central processing unit (CPU) 104. CPU 104 is coupled to system memory 110, within which firmware 112, operating system (OS) 116, power management utility (PMU) 118, and applications 114a-n can be stored for execution on CPU 104. According to one aspect, PMU 118 executes within portable device 100 to perform the various methods and functions described herein. In one or more embodiments, PMU 118 exchanges communications/notifications with a charging device to determine charging modes supported by the charging device and apply a particular charging mode to charging device 170. The particular charging mode is used to charge battery 134 of portable device 100. The particular charging mode is a target, preferred, and/or optimal charging mode for charging battery 134. In one or more embodiments, the particular charging mode may maximize a rate at which battery 134 is charged and/or minimize a portion of electrical energy that is wasted as heat during charging of battery 134. For simplicity, PMU 118 is illustrated and described as a standalone or separate software/firmware/logic component, which provides the specific functions and methods described below. However, in at least one embodiment, PMU 118 may be a component of, may be combined with, or may be incorporated within firmware 112, or OS 116 and/or within one or more applications 114a-n. CPU 104 is also coupled to non-volatile storage 120.

As shown, portable device 100 may include input devices and output devices that enable a user to interface with portable device 100. In the illustrated embodiment, portable device 100 includes camera sensor 142, camera flash 146, display 145, hardware buttons 106a-n, microphone 108, and speaker 144. Hardware buttons 106a-n are selectable buttons which are used to receive manual/tactile input from a user to control specific operations of portable device 100 and/or of applications executing thereon. In one embodiment, hardware buttons 106a-n may also include or may be connected to one or more sensors (e.g. a fingerprint scanner) and/or be pressure sensitive. Hardware buttons 106a-n may also be directly associated with one or more functions of a graphical user interface (not pictured) and/or functions of an OS, application, or hardware of portable device 100. In one embodiment, hardware buttons 106a-n may include a keyboard.

Portable device 100 also includes display 145, which is capable of displaying text, media content, and/or a graphical user interface (GUI) of firmware and/or one or more applications executing on portable device 100. The GUI can be rendered by CPU 104 for viewing on display 145 or be rendered by a graphics processing unit (GPU), in one embodiment. In one embodiment, display 145 is a touch screen that is also capable of receiving touch input from a user of portable device 100, when the user is interfacing with a displayed GUI. In at least one embodiment, portable device 100 can include a plurality of virtual buttons or affordances that operate in addition to, or in lieu of, hardware buttons 106a-n. For example, portable device 100 can be equipped with a touch screen interface and provide, via a GUI, a virtual keyboard or other virtual icons for user interfacing therewith.

Portable device 100 also includes battery 134, charging circuitry 136, and serial port 132 (e.g., a USB (universal serial bus) port) which can operate as a charging port that receives power via an external charging device 170 for charging battery 134. Serial port 132 may also function as one of an input port, an output port, and a combination input/output port. In one application, serial port 132 allows a direct physical connection to and communication of data with a second device. Serial port 132 also provides a physical interface between charging circuitry 136 and an external charging device 170 for charging battery 134. Charging circuitry 136 includes step-down component(s) 160 (e.g., a charger integrated circuit), which converts a received voltage (V) from external charging device 170 to a present voltage of battery 134. In one or more embodiments, charging circuitry 136 also includes switch component(s) 164 that when activated, bypasses step-down component(s) 160 and collapses (matches) a voltage provided by charging device 170 to a present voltage of battery 134, as described in greater detail in FIG. 2, below. Charging circuitry 136 also includes protection component(s) 162. In one embodiment, protection component(s) 162 may prevent battery 134 from being charged/discharged at an electrical current rate that is greater than a maximum electrical current rate that is supported by the battery.

Charging device 170 may be connected to any permanent power supply, such as an alternating current power supply outlet in a business or residence. In one embodiment, portable device 100 may also include inductive charging components 138 for wireless (inductive) charging of battery 134. In this embodiment, charging device 170 is an inductive charging device for electromagnetically (wirelessly) charging battery 134. Battery 134 may include a single battery or multiple batteries for providing power to components of portable device 100. In one embodiment, battery 134 may include at least one battery that is removable and/or replaceable by an end user. In another embodiment, battery 134 may include at least one battery that is permanently secured to portable device 100.

Portable device 100 also includes one or more wireless radios 140a-n and can include one or more antenna(s) 148a-n that enable portable device 100 to wirelessly connect to, and transmit and receive voice communication and/or data with, one or more other devices, such as devices 152a-n and server 154. As a wireless device, portable device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, portable device 100 may be further equipped with an infrared (IR) device (not pictured) for communicating with other devices using an IR connection. In another embodiment, wireless radios 140a-n may include a short-range wireless device, including, but not limited to, a near field communication (NFC) device. In still another embodiment, portable device 100 may communicate with one or more other device(s) using a wired or wireless USB connection. In one or more embodiments, devices 152a-n may include one or more charging devices (e.g., charging device 170).

Figure 2:
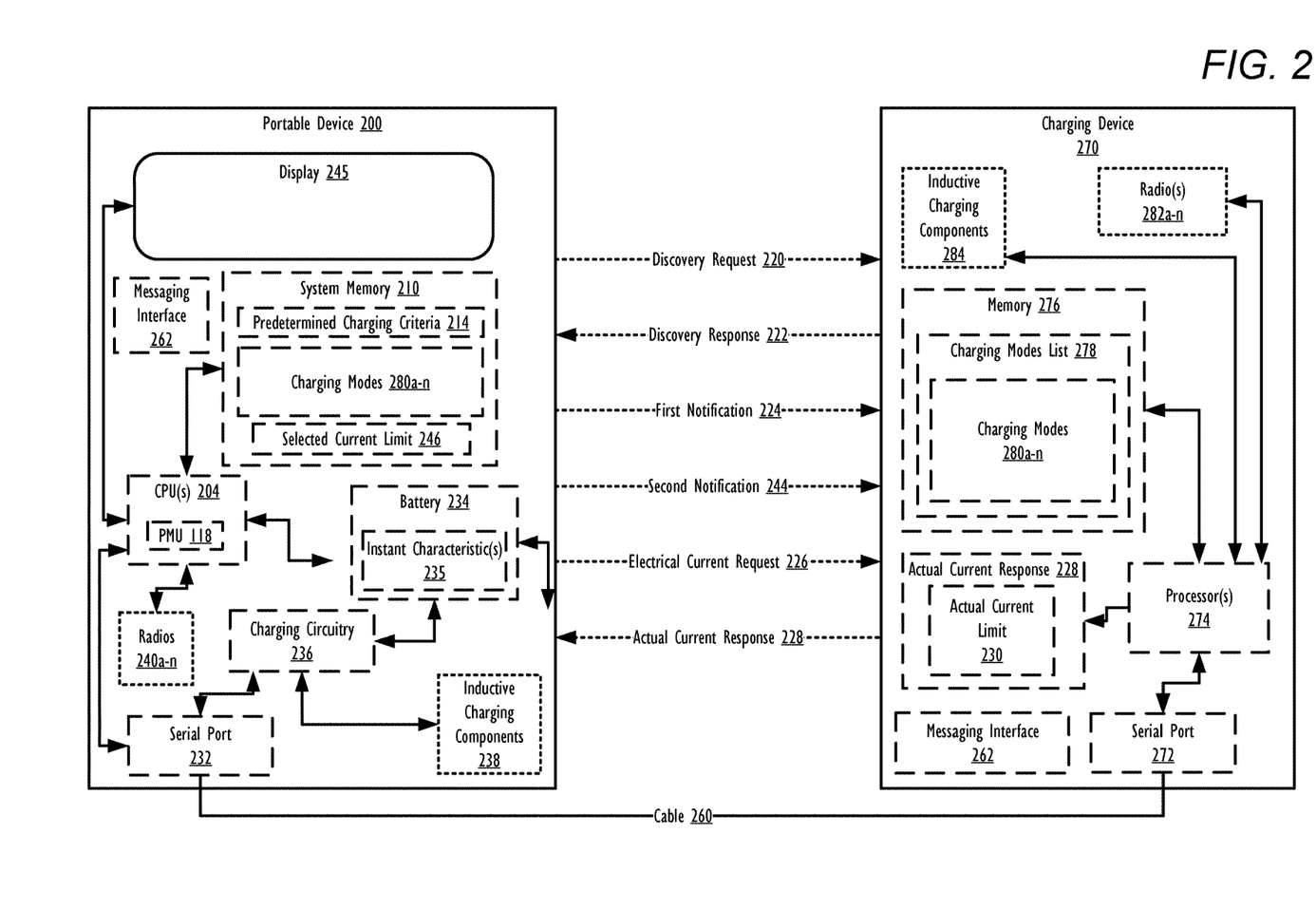
FIG. 2 illustrates a portable device configured to select a charging mode for charging a battery from among the set of charging modes supported by a connected charging device, in accordance with one or more embodiments.

FIG. 2 is a block diagram illustrating a portable device for selecting and applying a particular charging mode of a charging device for charging a battery, in accordance with one or more embodiments. It should be noted that portable device 200 may be configured as portable device 100 or another electronic device that includes the functional hardware and software components to execute PMU 118. For consistency in the description thereof, portable device 200 is assumed to be similar to portable device 100 and include similar components. Portable device 200 includes CPU(s) 204, battery 234, serial port 232, charging circuitry 236, inductive charging components 238, and system memory 210 within which predetermined charging criteria 214 is stored. Predetermined charging criteria 214 may include an identification of a preferred charging mode (e.g., charging mode 280b) to be applied to charging device 270 and/or establish preferred electrical current output(s) for an output of charging device 270 that is used to charge battery 234. Serial port 232 may be used to connect portable device 200 to charging device 270 via cable 260, thus providing an electrical voltage and current to portable device 200 for charging battery 234. The received electrical voltage and current are utilized by charging circuitry 236 to charge battery 234 of portable device 200. In one or more embodiments, charging circuitry 236 includes step-down component(s) (e.g., step-down component(s) 160), protection component(s) (e.g., protection component(s) 162), and a switch component(s) (e.g., switch components 164). Portable device 200 may also use serial port 232 to exchange messages and/or notifications with charging device 270 via a physical connection (e.g., cable 260) between serial port 232 and charging device 270, as described in greater detail below. It should be noted that battery 234 may include a single battery or multiple batteries, each of which may be permanently attached to portable device 200 or may be user-replaceable/swappable. In one embodiment, each of the multiple batteries may have a different charge capacity (e.g., different milliamp-hour (mAh) ratings). Other configurations of batteries can be provided, without limitation, in alternate embodiments. In one or more embodiments, portable device 200 may also include inductive charging components 238 for wireless (inductive) charging of battery 234.

Charging device 270 includes processor(s) 274, memory 276, and serial port 272. In an alternate embodiment, processor(s) 274 may include at least one microcontroller. Included within memory 276 is charging modes list 278, which identifies charging modes 280a-n supported by charging device 270. Memory 276 may be a non-volatile storage or system memory of charging device 270. Serial port 272 may be used to connect charging device 270 to portable device 200 via cable 260 for providing power to portable device 200, thus powering components of portable device 200 and/or charging battery 234.

PMU 118 continually monitors serial port 232 and detects when a connection with charging device 270 has been established. In one embodiment, the connection is a physical connection between portable device 200 and charging device 270 (e.g., cable 260). In another embodiment, charging device 270 may be an inductive (wireless) charging device including inductive charging components 284. Inductive charging components 284 create an oscillating magnetic field which may be converted by inductive charging components 238 of portable device 200 to electricity for use by charging circuitry 236 in charging battery 234. In this embodiment, portable device 200 and charging device 270 may exchange messages/notifications via a wireless connection between radios 240a-n and radio(s) 282a-n in lieu of a physical connection such as between serial port 232 and serial port 272. For example, messages/notifications may be transmitted over a wireless network (e.g., via a BLE or NFC network).

In one or more embodiments, PMU 118 may continually monitor instant characteristic(s) 235 of battery 234. Instant characteristic(s) 235 of battery 234 are real time measurements of characteristics of battery 234 and may include, but are not limited to: a current voltage, a capacity, an electrical current being provided for charging, state-of-charge (e.g. 40% charged), temperature, and battery chemistry.

In response to detecting the connection of charging device 270 to portable device 200, PMU 118 establishes messaging interface 262 with charging device 270 that utilizes the connection. In one or more embodiments, messaging interface 262 may be associated with a particular messaging protocol. Thus, with that embodiment, at least one of portable device 200 and charging device 270 may be preconfigured to communicate using the specific messaging protocol. In another embodiment, one of portable device 200 and charging device 270 may be preconfigured to communicate using a plurality of different messaging protocols. In this embodiment, at least one of portable device 200 and/or charging device 270 may select a specific messaging protocol from among the plurality of messaging protocols for use by both portable device 200 and charging device 270 to exchange messages/notifications. In one or more embodiments, portable device 200 and charging device 270 may support the USB Power Delivery (PD) messaging protocol, which defines a specific messaging interface for exchanging data via a serial port.

In response to establishing messaging interface 262, PMU 118 transmits discovery request 220 to charging device 270 to determine charging modes 280a-n supported by charging device 270. According to one embodiment, charging modes 280a-n establish an electrical current limit(s) and/or an electrical voltage limit(s) that charging device 270 outputs to a connected device (e.g., portable device 200) for the purposes of powering the connected device and/or charging a battery of the connected device. Charging modes 280a-n may also include at least one pre-established charging mode and/or industry standard charging mode (e.g., Universal Serial Bus (USB) 2.0 charging modes and USB 3.0 charging modes) which establishes a fixed voltage and/or current limit output for charging a battery of a connected device. As provided by charging modes list 278 within FIG. 4, charging mode 280a corresponds to an USB 3.0 industry standard charging mode that establishes a charging voltage of 5V and an electrical current limit output of charging device 270 to 0.9 amps (A).

Returning again to FIG. 2, in one or more embodiments, charging modes 280a-n may include at least one proprietary charging mode that may be associated with, for example, a particular vendor, manufacturer, device, device family, government, or corporation. In one or more embodiments, charging modes 280a-n include at least one collapsed state charging mode. In the collapsed state charging mode, step-down component(s) (e.g. step-down component(s) 160) within charging circuitry 236 are bypassed and an output voltage that is provided by charging device 270 is matched (i.e. "collapsed") to a current voltage of battery 234. While charging portable device 200, in a collapsed state charging mode, charging device 270 provides a variable electrical current within a predetermined electrical current range to portable device 200 for charging battery 234. In one or more embodiments, the level of current and/or voltage that is provided to portable device 200 by charging device 270, while charging device 270 is in a charging mode, may vary based on instant characteristic(s) 235 identified by PMU 118. In another one or more embodiments, the level of current that is provided to portable device 200 by charging device 270, while charging device 270 is in a charging mode, may vary based on instant characteristic(s) 235. Additionally, the level of current can be provided as a range starting from a smaller current value up to a maximum current, e.g., 10.23 A. In one or more embodiments, a charging mode may establish a plurality of steps, each of which defines a separate current limit and/or electrical voltage to be provided as an output to portable device 200. In another embodiment, portable device 200 and/or charging device 270 may communicate a desired step of the plurality of steps to be used via messaging interface 262. It should be noted, that the plurality of steps may include any number of steps. Additionally, the plurality of steps may or may not be evenly spaced. In another embodiment, messaging interface 262 may be used by portable device 200 to communicate instant characteristic(s) 235 to charging device 270.

Figure 4:
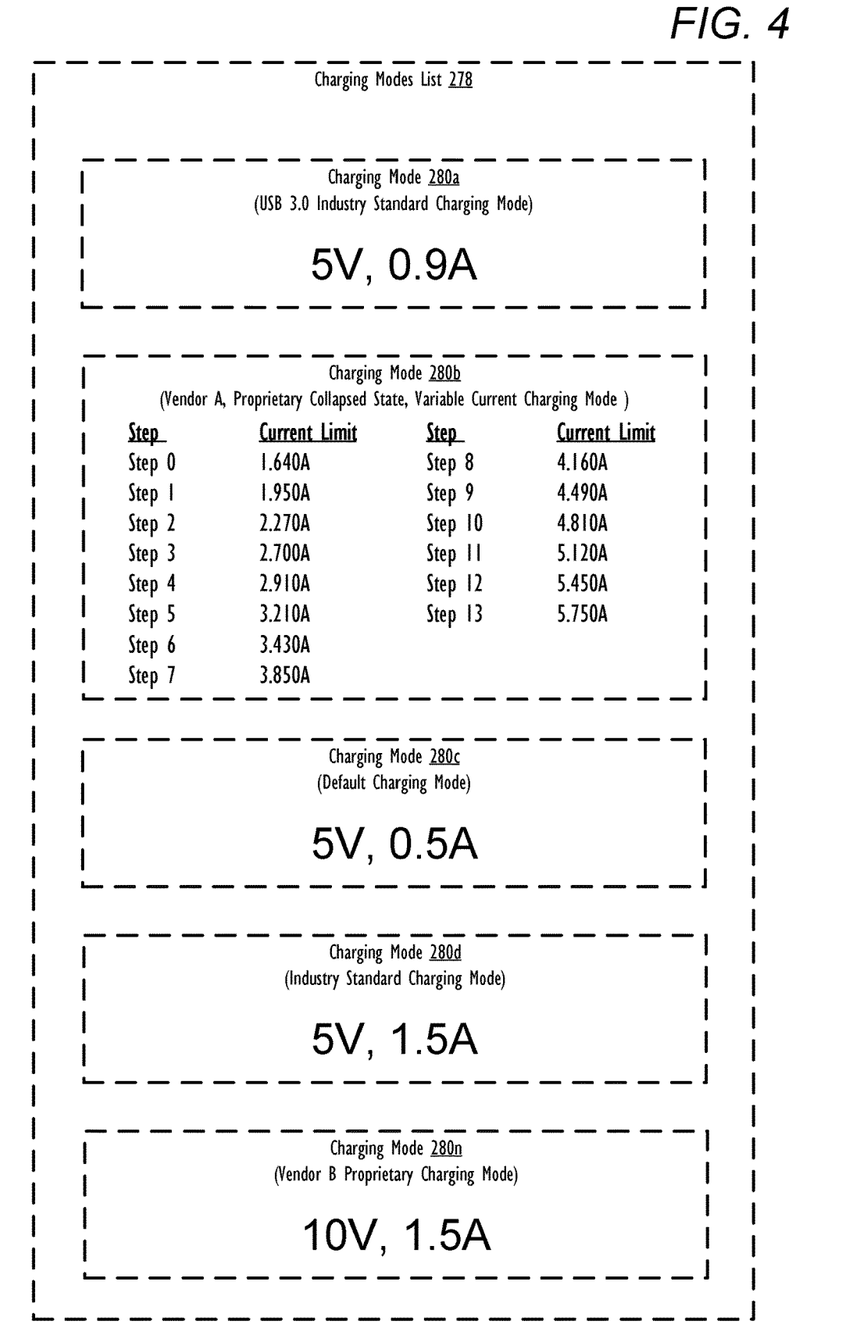
FIG. 4 illustrates an example charging modes list which establishes a plurality of charging modes supported by a corresponding charging device, in accordance with one or more embodiments.

As provided by FIG. 4, charging mode 280b is a proprietary collapsed state, variable current charging mode. As provided, exemplary charging mode 280b includes 14 steps, each of which defines a particular electrical current that may be provided to portable device 200 for charging battery 234. While exemplary charging mode 280b shows current steps in a range from 1.643 A to 5.901 A, in another embodiment, the current steps may include any number of current steps from a minimum current (e.g., 0.001 A) to a maximum current (e.g., 10.23 A). Additionally, while charging mode 280b in FIG. 4 only depicts a particular electrical current for each of the 14 steps, it should also be noted that in one or more embodiments a particular voltage may be established for any/all of the 14 steps. In another embodiment, a fixed voltage may be established within charging mode 280b that applies to all 14 steps. It should also be noted that while 14 steps are illustrated within FIG. 4, in another embodiment charging mode 280b may specify additional or fewer steps.

Returning again to FIG. 2, in response to transmitting discovery request 220 to charging device 270, portable device 200 receives, via serial port 232, discovery response 222. The received discovery response 222 includes charging modes list 278 which identifies charging modes 280a-n that are supported by charging device 270 for charging a connected device. PMU 118 may then analyze charging modes list 278 and determine whether a particular charging mode (e.g., charging mode 280b) is included in the charging modes 280a-n supported by charging device 270. The particular charging mode is a target, preferred, and/or optimal charging mode for charging battery 234. In one or more embodiments, the particular charging mode may maximize a rate at which battery 234 is charged and/or minimize a portion of electrical energy that is wasted as heat during charging of battery 234. In one embodiment, the particular charging mode is a collapsed state, variable current charging mode in which (1) the voltage provided to portable device 200 by the charging device 270 for charging battery 234 is dynamically adapted to a present/instant voltage of battery 234 and (2) the electrical current provided to the portable device 200 by the charging device 270 varies based on instant characteristic(s) 235. Charging modes 280a-n may also identify a plurality of steps and/or establish a current limit(s). The established current limit(s) can be greater or less than a current limit established by at least one pre-established industry standard charging mode from among charging modes 280a-n. In one embodiment, discovery response may include at least one standard vendor identifier (SVID) (not illustrated) for at least one charging mode of charging modes 280a-n. An SVID identifies a particular manufacturer that is associated with a charging device.

In response to determining the particular charging mode (e.g., charging mode 280b) is not included in charging modes 280a-n, PMU 118 may identify automatically select an alternate charging mode from among charging modes 280a-n for charging battery 234. In one or more embodiments, PMU 118 selects an alternate charging mode (e.g., charging mode 280d) from among charging modes 280a-n based on a fixed current and/or voltage established by the alternate charging mode. In response to selecting the alternate charging mode, PMU 118 transmits, via serial port 232 to charging device 270, second notification 244, which selects (and/or triggers the selection of) the alternate charging mode for charging battery 234.

In response to determining a particular charging mode (e.g., charging mode 280b) is included in charging modes 280a-n, PMU 118 transmits, via serial port 232 to charging device 270, first notification 224. First notification 224 triggers selection of the particular charging mode as a charging mode to be utilized by charging device 270 for charging battery 234. In response to receiving first notification 224, charging device 270 is triggered to operate in the particular charging mode and battery 234 is charged by charging device 270 at a particular electrical voltage and/or current that is established by the particular charging mode. In one or more embodiments, first notification 224 may include an unstructured vendor defined message (VDM).

In the illustrated embodiment provided by FIG. 4, charging mode 280b is the collapsed state, variable current charging mode. In this embodiment, in response to receiving first notification 224, which includes a selection of charging mode 280b, charging device 270 is triggered to collapse/match an output voltage provided to portable device 200 to a current voltage of battery 234. In response to placing charging device 270 in a collapsed state charging mode, PMU 118 continually monitors instant characteristic(s) 235 of battery 234. PMU 118 may then determine and issue, to charging device 270, electrical current request 226. Electrical current request 226 identifies a selected current limit 246 to be used by charging device 270 in the particular charging mode for charging battery 234. Selected current limit 246 establishes a current limit that maximizes/optimizes the speed at which battery 234 is charged while charging device 270 is operating in charging mode 280b. In one embodiment, PMU 118 may determine selected current limit 246 based on instant characteristic(s) 235. In response to receiving electrical current request 226, charging device 270 is configured to (1) determine actual current limit 230 that is equivalent or closest to, but lower than, selected current limit 246 identified in electrical current request 226 and (2) apply actual current limit 230 to a current output provided by charging device 270. After sending electrical current request 226 to charging device 270, portable device 200 receives actual current response 228, which identifies actual current limit 230 selected by charging device 270.

In response to receiving actual current response 228, PMU 118 determines whether actual current limit 230 satisfies predetermined charging criteria 214. In response to determining actual current limit 230 does not satisfy predetermined charging criteria 214, PMU 118 automatically selects a new current limit, as selected current limit 246. In one embodiment, the new selected current limit is lower than the previous current limit. In another embodiment, the new selected current limit may be higher than the previous current limit. PMU 118 then retransmits electrical current request 226, including the selected current limit 246, to charging device 270. In response to transmitting electrical current request 226 with selected current limit 246 to charging device 270, portable device 200 may again receive actual current response 228 and may perform the steps described above in an iterative fashion until selected current limit 246 is determined to satisfy predetermined charging criteria 214. In one or more embodiments, selected current limit 246 and/or actual current limit 230 may correspond to a step of the plurality of steps established by a charging mode. In another embodiment, in response to determining actual current limit 230 does not satisfy predetermined charging criteria 214, PMU 118 may transmit to charging device 270, electrical current request 226, including an alternate charging mode from among charging modes 280a-n that is different than the previously selected particular charging mode and that is to be used by charging device 270 for charging battery 234.

In one or more embodiments, charging device 270 may apply a default charging mode (e.g., charging Mode 280c of FIG. 4) which establishes a fixed voltage (e.g., 5 volts) and/or current (e.g., 0.5 amps) for charging battery 234 if charging device 270 has not received discovery request 220, first notification 224, and/or second notification 244. In another embodiment, charging device 270 may apply a default charging mode (e.g., charging mode 280c of FIG. 4) until an actual current limit 230 is determined to satisfy predetermined charging criteria 214. In still another embodiment, if an actual current limit 230 that satisfies predetermined charging criteria 214 cannot be determined, PMU 118 may select a default charging mode (e.g., charging mode 280c of FIG. 4).

In one or more embodiments, during charging of battery 234 PMU 118 may also determine when battery 234 is completely charged. In response to determining battery 234 is completely charged, PMU 118 may select, as the selected current limit 246, an electrical current (and/or voltage) which provides sufficient power to portable device 200 to maintain the complete charge of battery 234. PMU 118 then retransmits electrical current request 226, including the selected current limit 246, to charging device 270. In another embodiment, in response to determining battery 234 is completely charged, PMU 118 may select a particular charging mode (e.g. a low-power charging mode) until battery 234 has discharged a predetermined amount.

Figure 3:
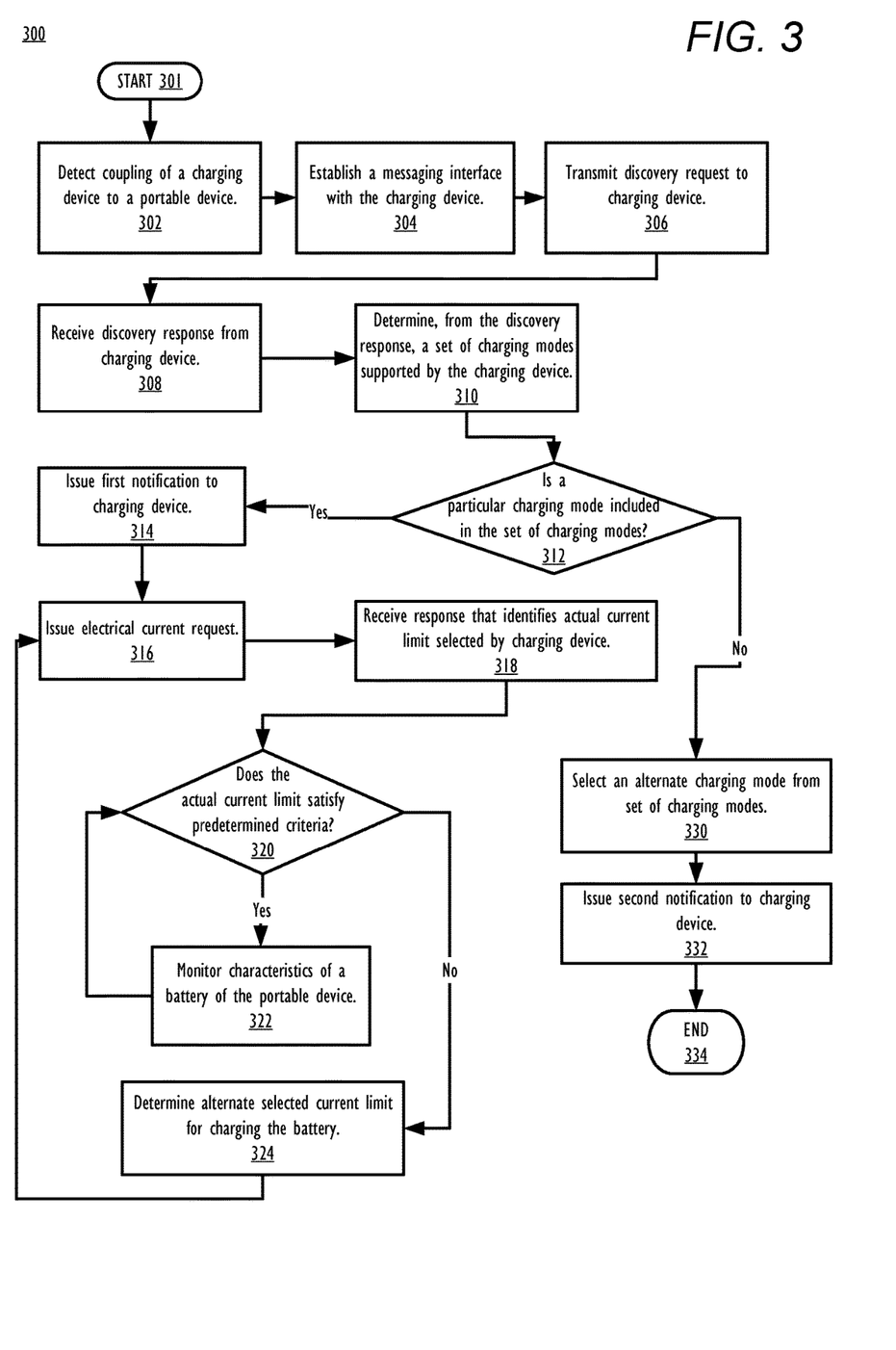
FIG. 3 is a flow chart illustrating a method for selecting a charging mode for charging a battery from among a set of charging modes supported by a connected charging device, in accordance with one or more embodiments.

Referring now to FIG. 3, there is depicted a high-level flow-chart illustrating a method for selecting a charging mode for charging a battery from among a set of charging modes supported by a charging device, in accordance with one or more embodiments of the present disclosure. Aspects of the method are described with reference to the components of FIGS. 1-2 and 4. Several of the processes of the method provided in FIG. 3 can be implemented by a processor (e.g., CPU 104 or CPU 204) executing software code of PMU 118 within a portable device (e.g., FIG. 1 and FIG. 2) or generic data processing system. The method processes described in FIG. 3 are generally described as being performed by portable device 200.

Method 300 commences at initiator block 301, then proceeds to block 302. At block 302, portable device 200, executing PMU 118, detects a coupling of charging device 270 to portable device 200. At block 304, PMU 118 establishes messaging interface 262 with charging device 270. At block 306, portable device generates discovery request 220 and transmits to charging device 270 via messaging interface 262. Portable device 200 then receives discovery response 222 from charging device 270 (block 308). At block 310, discovery response 222 is analyzed to determine charging modes 280a-n that are supported by charging device 270. At block 312, a determination is made whether the particular charging mode is included in charging modes 280a-n.

In response to determining at block 312 that the particular charging mode is included in charging modes 280a-n, first notification 224, which identifies the particular charging mode, is issued to charging device 270 (block 314). At block 316, portable device 200 transmits electrical current request 226, which identifies selected current limit 246 to be used by charging device 270. At block 318, actual current response 228, which identifies actual current limit 230, is received. It should also be noted that in one or more embodiments, charging device 270 may activate a charging mode associated with actual current limit 230 in conjunction with transmitting actual current response 228 to portable device 200. At block 320, PMU determines whether actual current limit 230 satisfies predetermined charging criteria 214. In response to determining (at decision block 320) that actual current limit 230 satisfies predetermined charging criteria 214, method 300 continues to block 322 and instant characteristic(s) 235 of battery 234 are monitored. Method 300 then loops back to block 320.

In response to determining (at block 320) that actual current limit 230 does not satisfy predetermined charging criteria 214, selected current limit 246 is established to a new level that is a different than a previous current limit (block 324). Method 300 then loops back to block 316 in an iterative fashion.

In response to determining at block 312 the particular charging mode is not included in charging modes 280a-n, an alternate charging mode is selected from among charging modes 280a-n (block 330). Second notification 224, which identifies the selected alternate charging mode, is then generated by portable device and transmitted to charging device 270 (block 332). Method 300 then terminates at end block 334.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   detecting a coupling of a charging device at a portable device having a battery and charging circuitry that includes at least one step-down component, which converts a received voltage from the charging device to a present voltage of the battery, the charging circuitry further including at least one switch component that when activated, bypasses the at least one step-down component and collapses a voltage provided by the charging device to match a present voltage of the battery;
   determining, based on information received from the charging device, a set of charging modes that are supported by the charging device;
   identifying whether the set of charging modes includes a collapsed state charging mode;
   in response to identifying that the set of charging modes includes the collapsed state charging mode, issuing a first notification to the charging device that identifies the collapsed state charging mode and that, when received by the charging device, triggers the charging device to operate in the collapsed state charging mode, wherein the collapsed state charging mode establishes at least one particular electrical current to be used for charging the battery; and
   in response to determining the set of charging modes does not include the collapsed state charging mode, selecting an alternate charging mode from among the set of charging modes supported by the charging device and issuing a second notification to the charging device, the second notification identifying the alternate charging mode and triggering the charging device to operate in the alternate charging mode.

2. The method of claim 1, wherein:
in the collapsed state charging mode: (i) a voltage provided to the portable device by the charging device for charging the battery is dynamically adapted to a present voltage of the battery and (ii) the at least one particular electrical current provided to the portable device by the charging device varies based on at least one instant characteristic of the battery.

3. The method of claim 2, further comprising:
in response to issuing the first notification to the charging device:
continually monitoring the at least one instant characteristic of the battery;
dynamically determining an electrical current limit for charging the battery based on the at least one instant characteristic;
automatically issuing, to the charging device via a messaging interface, a request to establish the at least one particular electrical current at the electrical current limit; and
receiving, from the charging device via the messaging interface, a response that identifies an actual electrical current limit selected by the charging device based on the request, wherein the charging device charges the battery at the actual electrical current limit while the charging device is operating in the collapsed state charging mode.

4. The method of claim 3, further comprising:
determining whether the actual electrical current limit satisfies a predetermined charging criteria; and
in response to determining the actual electrical current limit does not satisfy the predetermined charging criteria, automatically selecting a current limit that is different from the actual electrical current limit for charging the battery.

5. The method of claim 1, further comprising:
in response to detecting the coupling of the charging device to the portable device, establishing a messaging interface with the charging device; and
determining the set of charging modes by:
transmitting, to the charging device via the messaging interface, a discovery request to identify the set of charging modes; and
receiving, from the charging device via the messaging interface, a discovery response that includes the set of charging modes.

6. The method of claim 1, wherein the the alternate charging mode is a non-collapsed state charging mode, the method further comprising:
in response to selecting the alternate charging mode, issuing, to the charging device, a second notification that identifies the selected alternate charging mode, wherein in the alternating charging mode the charging device provides a consistent voltage to the portable device for charging the battery.

7. The method of claim 1, wherein the charging modes include at least one proprietary charging mode associated with at least one of a particular vendor, manufacturer, device, device family, government, or corporation.

8. The method of claim 1, wherein the collapsed state charging mode provides a range of levels of current values starting from a smaller current value up to a maximum current value, and the current is adjusted via a plurality of current steps from a minimum current to a maximum current, wherein a fixed voltage is established within the charging mode that applies to all current steps.

9. The method of claim 1, further comprising:
determining by the PMU, when the battery is completely charged; and
in response to determining that the battery is completely charged:
selecting, as a selected current limit, one of an electrical current or voltage that provides sufficient power to the portable device to maintain a complete charge of the battery; and
retransmitting another electrical current request, including the selected current limit, to the charging device.

10. The method of claim 1, further comprising:
determining by the PMU, when the battery is completely charged; and
in response to determining that the battery is completely charged, selecting a low-power charging mode until the battery has discharged by a predetermined amount.

11. A portable device comprising:
a memory;
a battery;
charging circuitry coupled to the battery and that includes at least one step-down component, which converts a received voltage from the charging device to a present voltage of the battery, the charging circuitry further including at least one switch component that when activated, bypasses the at least one step-down component and collapses a voltage provided by the charging device to match a present voltage of the battery;
a port for connecting a charging device to the portable device;
a processor that is coupled to the memory and which generates a plurality of processing modules comprising a charging management module that configures the processor to perform charging management measures, wherein:
the charging management module:
detects a coupling of the charging device to the port;
determines, based on information received from the charging device, a set of charging modes that are supported by the charging device;
identifies whether the set of charging modes includes a collapsed state charging mode;
in response to identifying that the set of charging modes includes the collapsed state charging mode, issues a first notification to the charging device that identifies the collapsed state charging mode and that, when received by the charging device, triggers the charging device to operate in the collapsed state charging mode, wherein the collapsed state charging mode establishes at least one particular electrical current to be used for charging the battery; and
in response to determining the set of charging modes does not include the collapsed state charging mode, selects an alternate charging mode from among the set of charging modes supported by the charging device and issue a second notification to the charging device, the second notification identifying the alternate charging mode and triggering the charging device to operate in the alternate charging mode.

12. The portable device of claim 11, wherein:
in the collapsed state charging mode: (i) a voltage provided to the portable device by the charging device for charging the battery is dynamically adapted to a present voltage of the battery and (ii) the at least one particular electrical current provided to the portable device by the charging device varies based on at least one instant characteristic of the battery.

13. The portable device of claim 12, wherein the charging management module:
in response to issuing the first notification to the charging device:
continually monitors the at least one instant characteristic of the battery;
dynamically determines an electrical current limit for charging the battery based on the at least one instant characteristic;
automatically issues, to the charging device via a messaging interface, a request to establish the at least one particular electrical current at the electrical current limit; and
receives, from the charging device via the messaging interface, a response that identifies an actual electrical current limit selected by the charging device based on the request, wherein the charging device charges the battery at the actual electrical current limit while the charging device is operating in the collapsed state charging mode.

14. The portable device of claim 13, wherein the charging management module:
determines whether the actual electrical current limit satisfies a predetermined charging criteria; and
in response to determining the actual electrical current limit does not satisfy the predetermined charging criteria, automatically selects a current limit that is different from the actual electrical current limit for charging the battery.

15. The portable device of claim 11, wherein the charging management module:
in response to detecting the coupling of the charging device to the port, establishes a messaging interface with the charging device; and
in determining the set of charging modes:
transmits, to the charging device via the messaging interface, a discovery request to identify the set of charging modes; and
receives, from the charging device via the messaging interface, a discovery response that includes the set of charging modes.

16. The portable device of claim 11, wherein the alternate charging mode is a non-collapsed state charging mode, wherein the charging management module:
in response to selecting the alternate charging mode, issues, to the charging device, a second notification that identifies the selected alternate charging mode, wherein in the alternating charging mode the charging device provides a consistent voltage to the portable device for charging the battery.

17. A computer program product comprising:
a computer readable storage device; and
program code on the computer readable storage device that when executed by a processor associated with a portable device, the program code enables the device to provide the functionality of:
detecting a coupling of a charging device at the portable device, the portable device having a battery and charging circuitry that includes at least one step-down component, which converts a received voltage from the charging device to a present voltage of the battery, the charging circuitry further including at least one switch component that when activated, bypasses the at least one step-down component and collapses a voltage provided by the charging device to match a present voltage of the battery;
determining, based on information received from the charging device, a set of charging modes that are supported by the charging device;
identifying whether the set of charging modes includes a collapsed state charging mode;
in response to identifying that the set of charging modes includes the collapsed state charging mode, issuing a first notification to the charging device that identifies the collapsed state charging mode and that, when received by the charging device, triggers the charging device to operate in the collapsed state charging mode, wherein the collapsed state charging mode establishes at least one particular electrical current to be used for charging the battery; and
in response to determining the set of charging modes does not include the collapsed state charging mode, selecting an alternate charging mode from among the set of charging modes supported by the charging device and issuing a second notification to the charging device, the second notification identifying the alternate charging mode and triggering the charging device to operate in the alternate charging mode.

18. The computer program product of claim 17, wherein:
in the collapsed state charging mode: (i) a voltage provided to the portable device by the charging device for charging the battery is dynamically adapted to a present voltage of the battery and (ii) the at least one particular electrical current provided to the portable device by the charging device varies based on at least one instant characteristic of the battery.

19. The computer program product of claim 18, wherein the program code further comprises program code that enables the portable device to provide the functionality of:
in response to issuing the first notification to the charging device:
continually monitoring the at least one instant characteristic of the battery;
dynamically determining an electrical current limit for charging the battery based on the at least one instant characteristic;
automatically issuing, to the charging device via a messaging interface, a request to establish the at least one particular electrical current at the electrical current limit; and
receiving, from the charging device via the messaging interface, a response that identifies an actual electrical current limit selected by the charging device based on the request, wherein the charging device charges the battery at the actual electrical current limit while the charging device is operating in the collapsed state charging mode.

20. The computer program product of claim 17, wherein the program code further comprises program code that enables the portable device to provide the functionality of:
in response to detecting the coupling of the charging device to the portable device, establishing a messaging interface with the charging device;
wherein the program code for determining the set of charging modes further comprises program code that enables the portable device to provide the functionality of:
transmitting, to the charging device via the messaging interface, a discovery request to identify the set of charging modes; and receiving, from the charging device via the messaging interface, a discovery response that includes the set of charging modes.

* * * * *